(12) United States Patent
Lee

(10) Patent No.: US 6,283,257 B1
(45) Date of Patent: Sep. 4, 2001

(54) DISC BRAKE OF TWO-WHEELED VEHICLE

(76) Inventor: Min-Hsiang Lee, P.O. Box 453, Taichung (TW)

( * ) Notice: Subject to any disclaimer, the term of this patent is extended or adjusted under 35 U.S.C. 154(b) by 0 days.

(21) Appl. No.: 09/659,418

(22) Filed: Sep. 11, 2000

(51) Int. Cl.[7] .................................................. F16D 65/12
(52) U.S. Cl. .................................. 188/218 XL; 188/73.2; 188/251 R; 188/250 G; 188/24.11; 188/24.13
(58) Field of Search ............................ 188/71.1, 218 XL, 188/73.2, 250 G, 250 E, 261, 24.11, 24.13, 24.12, 251 R, 85, 264 B, 18 A; 192/107 M, 70.14, 187 R, 52.1–52.4; 301/95, 97, 98, 6–9; D12/179

(56) References Cited

U.S. PATENT DOCUMENTS

| | | | |
|---|---|---|---|
| 3,042,168 | * | 7/1962 | Binder . |
| 3,433,327 | * | 3/1969 | Regis ................................. 188/24.13 |
| 3,712,428 | * | 1/1973 | Marih ................................... 188/73.2 |
| 3,732,951 | * | 5/1973 | Hata et al. ........................ 188/24.13 |
| 4,600,090 | * | 7/1986 | Feldman et al. ............... 188/218 XL |
| 5,934,418 | * | 8/1999 | Wirth ............................... 188/250 G |
| 6,065,812 | * | 5/2000 | Lee .................................... 188/24.13 |

\* cited by examiner

*Primary Examiner*—Douglas C. Butler

(57) ABSTRACT

A disc brake of a two-wheeled vehicle comprises two friction pads which press against either side of a disc rotating along with the wheel of the vehicle in motion. The friction pads are provided with a friction surface. The disc is provided in the surface of both sides thereof with a plurality of first arrest surfaces, second arrest surfaces, and recesses, which are all exerted on sequentially by a stress brought about by the friction surface of the friction pads at the time when the friction pads press on the disc.

2 Claims, 5 Drawing Sheets

DISC BRAKE OF TWO-WHEELED VEHICLE

BACKGROUND OF THE INVENTION

1. Field of the Invention

The present invention relates generally to a two-wheeled vehicle, and more particularly to a disc brake of the two-wheeled vehicle.

2. Description of Related Art

The conventional disc brake of a two-wheeled vehicle, such as a bicycle, is generally effective in slowing or stopping the bicycle in motion; nevertheless it is defective in design in that it is prone to jam the bicycle wheel in motion, especially at the time when the bicycle is cruising at a high speed. The jamming of the bicycle wheel in motion can result in the overturn of the bicycle. In addition, the constant friction between the friction pads of the disc brake and the surface of the disc rotating along with the bicycle wheel causes wear of the disc, thereby shortening the service life span of the disc brake.

BRIEF SUMMARY OF THE INVENTION

The primary objective of the present invention is to provide a disc brake which is designed for use in a two-wheeled vehicle and is free from the deficiencies of the conventional disc brake described above.

In keeping with the principle of the present invention, the foregoing objective of the present invention is attained by a disc brake which is designed for use in a two-wheeled vehicle and is formed of a disc and two friction pads. The disc is provided in the surfaces with a stopping area. The friction pads are provided with a friction surface corresponding in location to the stopping area of the disc.

The features and the advantages of the present invention will be more readily understood upon a thoughtful deliberation of the following detailed description of a preferred embodiment of the present invention with reference to the accompanying drawings.

BRIEF DESCPITION OF THE SEVERAL VIEWS OF THE DRAWINGS

FIG. 4-1 shows a sectional schematic view of the present invention in action.

FIG. 5-1 shows another sectional schematic view of the present invention in action.

DETAILED DESCRIPTION OF THE INVENTION

Figure 1:
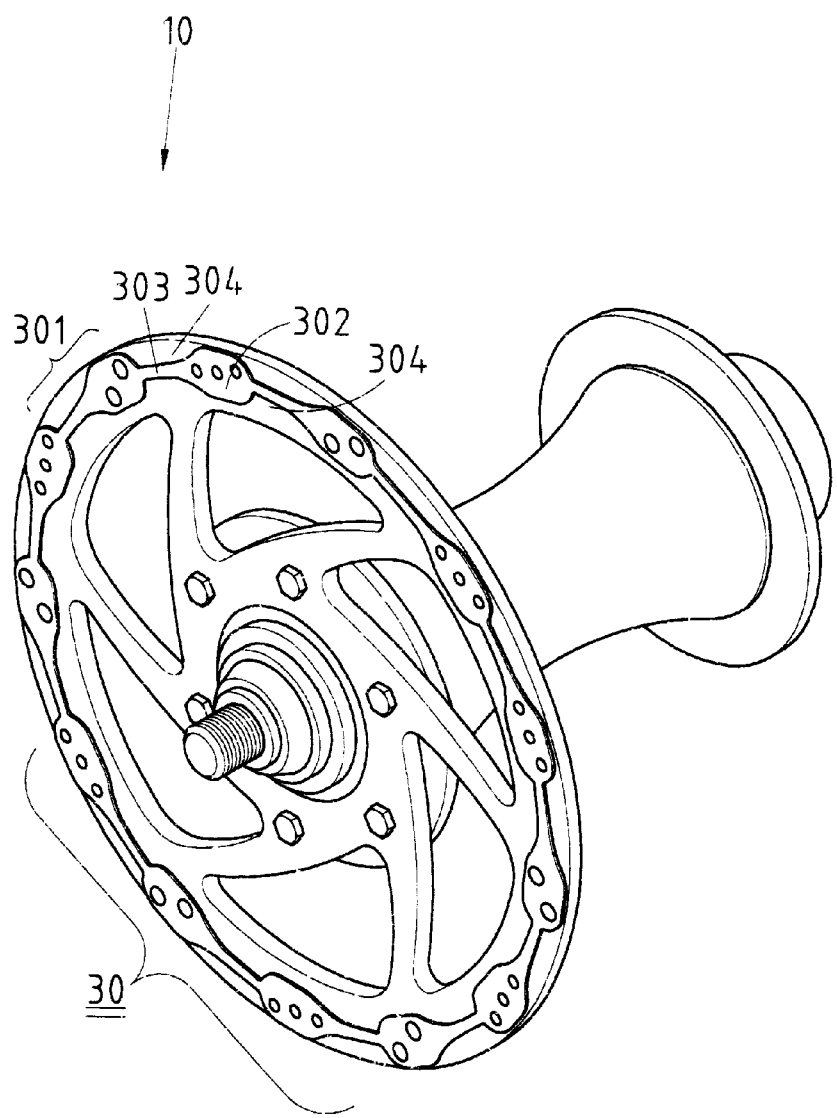
FIG. 1 shows a perspective view of the preferred embodiment of the present invention.
Figure 2:
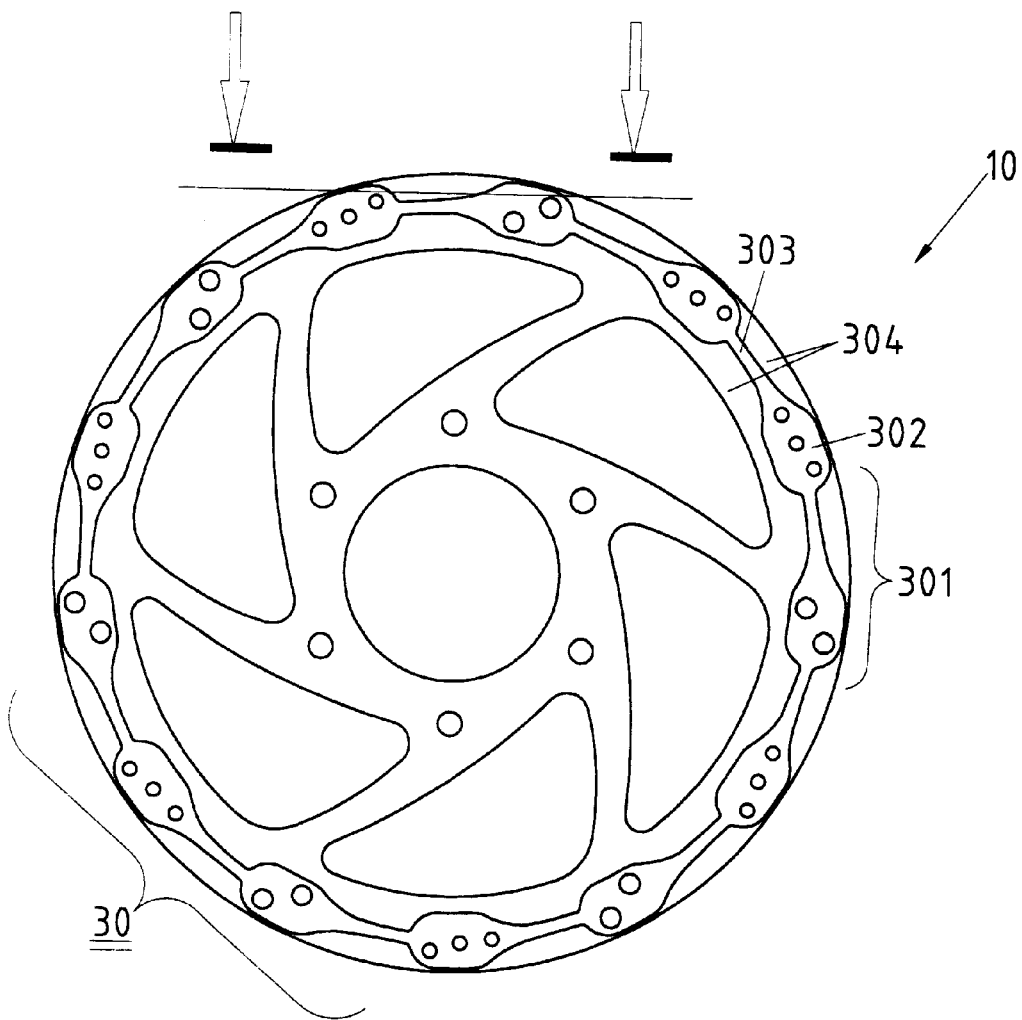
FIG. 2 shows a schematic plan view of the preferred embodiment of the present invention.
Figure 3:
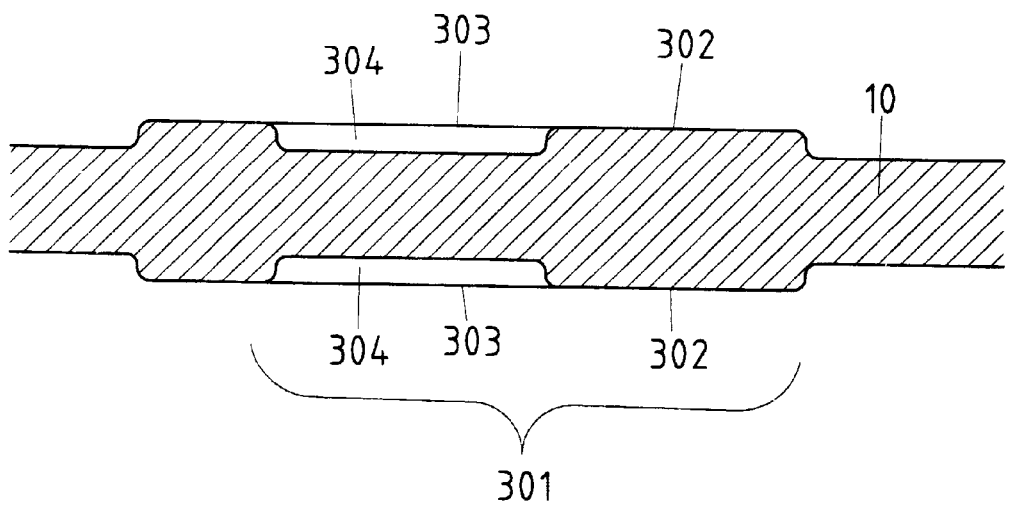
FIG. 3 shows a sectional view of the present invention.

As shown in FIGS. 1–3, a bicycle disc brake of the preferred embodiment of the present invention comprises a disc 10 and two friction pads 20.

The disc 10 is provided in the surfaces with a stopping area 30, whereas the friction pads 20 are provided with a friction surface 201 corresponding to the stopping area 30 of the disc 10. The stopping area 30 comprises a plurality of arrest divisions 301 which are contiguous to one another and are dimensioned to be pressed against by the friction surface 201 of the friction pad 20. Each arrest division 301 is provided in one side with a first arrest surface 302, and in other side with a second arrest surface 303 which is smaller in size than the first arrest surface 302 and is contiguous to the first arrest surface 302 of an adjoining arrest division 301. The second arrest surface 303 of each of the arrest divisions 301 is provided in two sides with a recess 304. When the friction surface 201 of the friction pad 20 is actuated to press on the stopping area 30 of the disc 10 rotating along with the bicycle wheel, the friction surface 201 of the friction pad 20 brings about a stress, which exerts sequentially on the arrest divisions 301 and the recesses 304 of the disc 10, thereby bringing the bicycle in motion to a halt with stability and without jamming the bicycle wheel.

Preferably, the friction surface 201 of the friction pad 20 of the present invention is of an area which is slightly greater than the sum of the areas of the first arrest surface 302, the second arrest surface 303, and the two recesses 304 of the second arrest surface 303 of any one of the arrest divisions 301.

Figure 4:
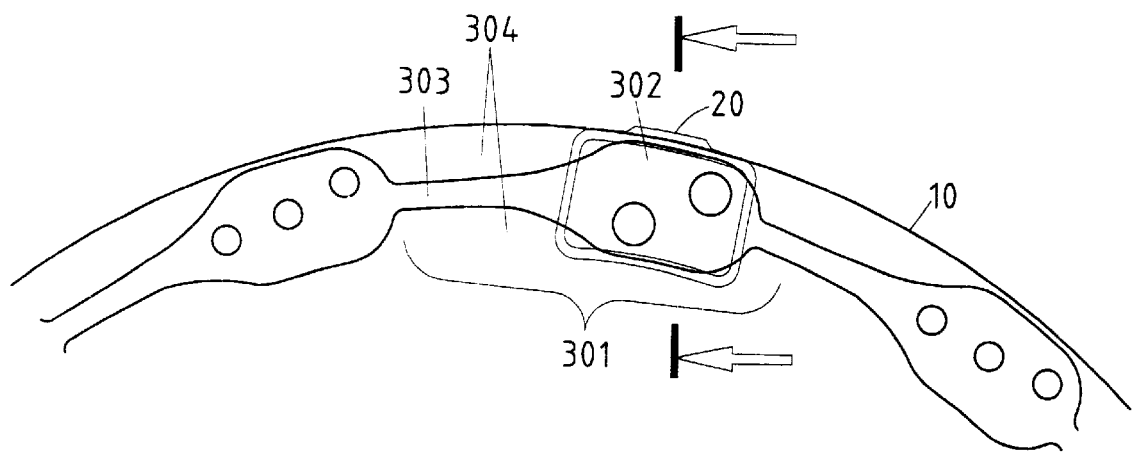
FIG. 4 shows a schematic plan view of the present invention in action.
Figures 1, 4:
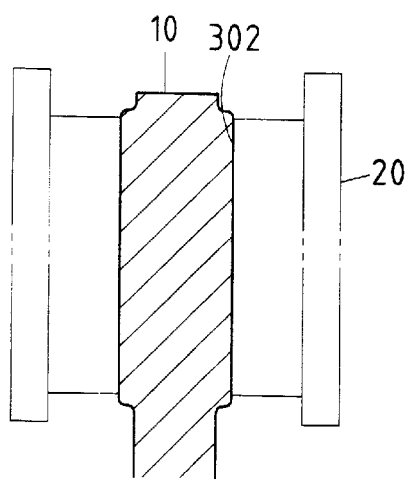
Figure 5:
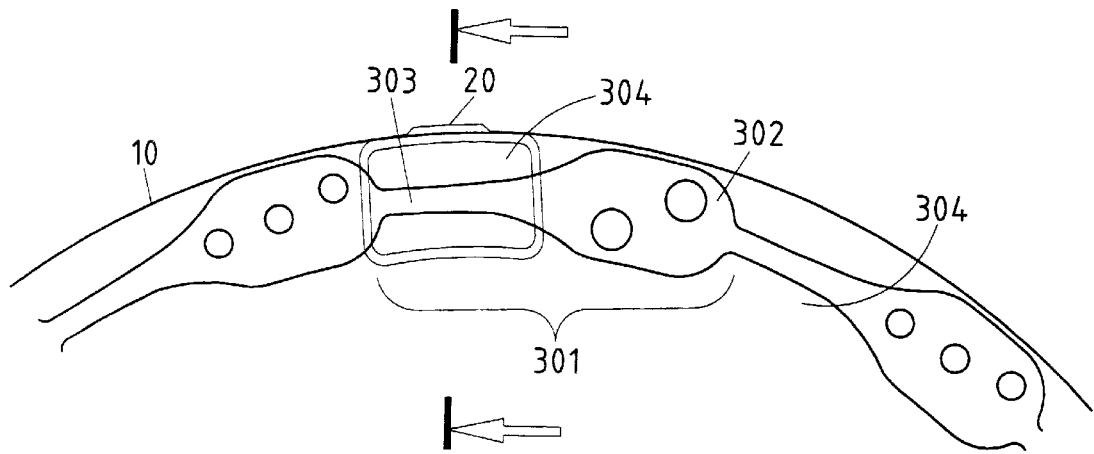
FIG. 5 shows another schematic plan view of the present invention in action.
Figures 1, 5:
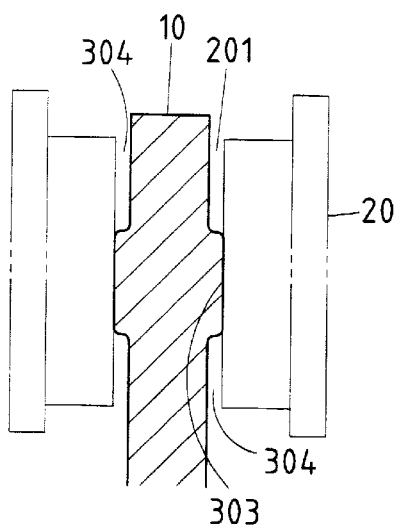

As illustrated in FIGS. 4, 4-1, 5, and 5-1, when the friction surface 201 of the friction pad 20 presses against the stopping area 30 of the disc 10, all arrest divisions 301 of the stopping area 30 are pressed against by the friction surface 201 of the friction pad 20 in rotation because of the fact that the disc 10 rotates along with the bicycle wheel. In light of the first arrest surface 302, the second arrest surface 303, and the recesses 304 being different in size, the stress of the friction surface 201 of the friction pad 20 exerts on the disc 10 in a progressive manner, so as to stop the bicycle in motion gradually, without jamming the bicycle wheel.

The embodiment of the present invention described above is to be regarded in all respects as being merely illustrative and not restrictive. Accordingly, the present invention may be embodied in other specific forms without deviating from the spirit thereof. The present invention is therefore to be limited only by the scopes of the following appended claims.

I claim:

1. A disc brake of a two-wheeled vehicle, said disc brake comprising two friction pads which press on either side of a disc rotating along with the wheel of the two-wheeled vehicle in motion; wherein said friction pads are provided with a friction surface; wherein said disc is provided in the surface of both sides thereof with a stopping area corresponding to said friction surface of said friction pads, said stopping area comprising a plurality of arrest divisions contiguous to one another, with each of said arrest division being provided in one side with a first arrest surface, and in other side with a second arrest surface smaller in size than said first arrest surface and contiguous to said first arrest surface of an adjoining arrest division, said second arrest surface provided in two sides thereof with a recess, whereby said friction surface of said friction pad presses on said stopping area of said disc rotating along with the wheel of the two-wheeled vehicle in motion, thereby resulting in a stress exerting sequentially on said first arrest surface, said second arrest surface, and said recesses of said arrest divisions ot said stopping area of said disc.

2. The disc brake as defined in claim 1, wherein said friction surface of said friction pads has an area greater than the sum of areas of said first arrest surface, said second arrest surface, and said recesses of any one of said arrest divisions of said disc.

* * * * *